United States Patent

Jauvtis

[15] 3,656,126

[45] Apr. 11, 1972

[54] BI-DIRECTIONAL SHIFT REGISTER

[72] Inventor: Harvey I. Jauvtis, Belmont, Mass.

[73] Assignee: The United States of America as represented by the Secretary of the Air Force

[22] Filed: Dec. 31, 1969

[21] Appl. No.: 889,446

[52] U.S. Cl. .............340/174 FB, 340/174 LA, 340/174 TF, 340/174 ZB

[51] Int. Cl. .........................................................G11c 21/00

[58] Field of Search .................340/174 TF, 174 FB, 174 ZB, 340/174 LA

[56] References Cited

UNITED STATES PATENTS 3,438,016 4/1969 Spain ..............................340/174 FB

*Primary Examiner*—James W. Moffitt

*Attorney*—Harry A. Herbert, Jr. and Julian L. Siegel

[57] ABSTRACT

A magnetic domain punch-through diode shift register having a pair of vertical low coercive channels in a region of high coercivity. Dispersed in the channels are punch-through magnetic domain diodes which alternate with opposing polarities. A domain can be propagated in only one direction by applying a conducting pulse to a chosen diode at the same time as a drive pulse is applied. A folded hold conductor alternates its direction between every two diodes.

3 Claims, 5 Drawing Figures

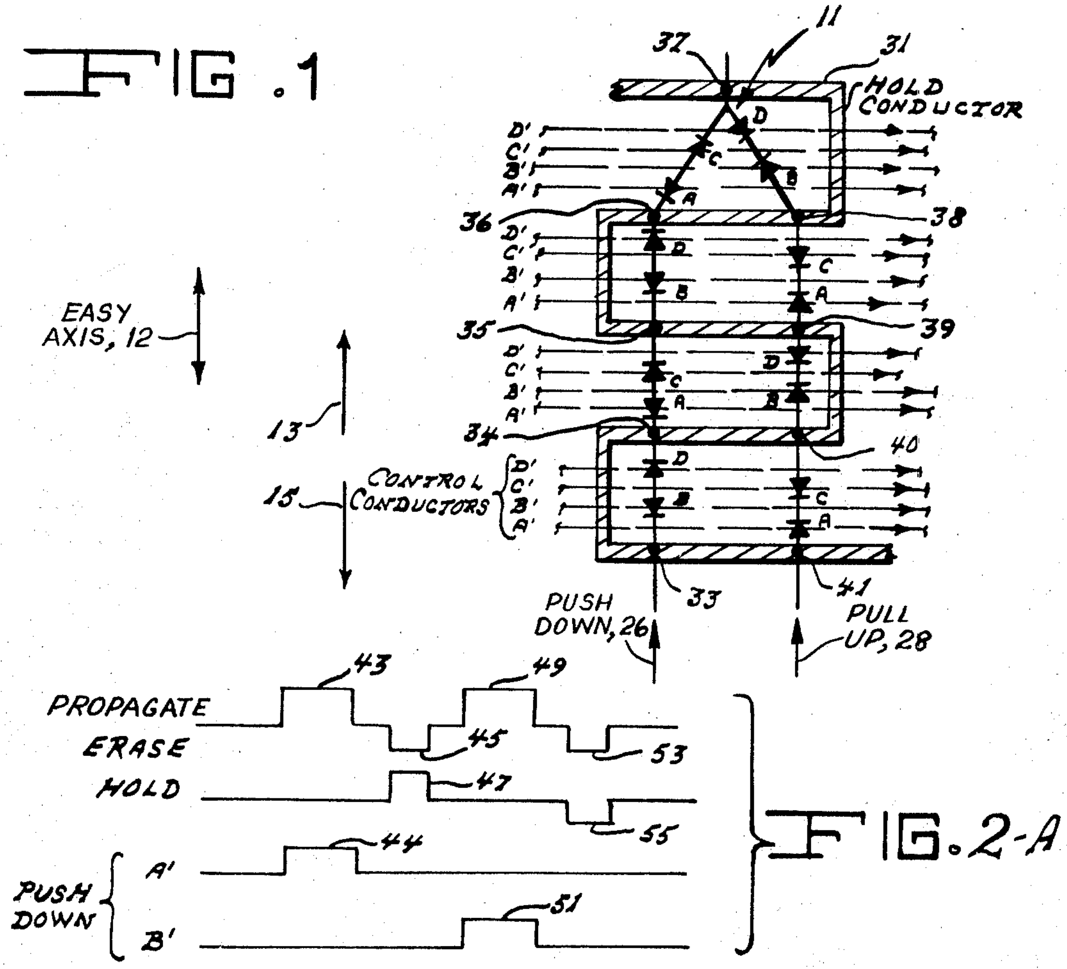
FIG. 1, FIG. 2-A
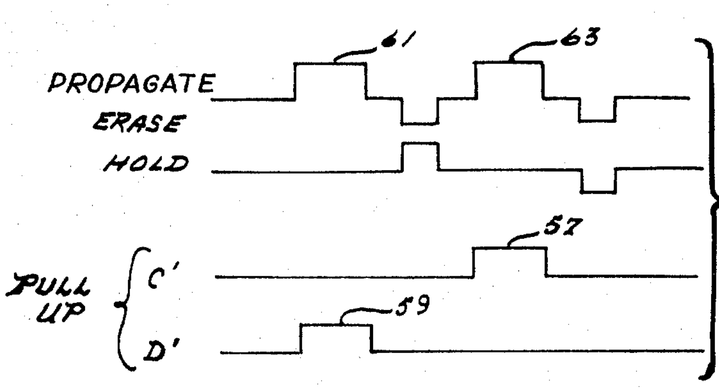
FIG. 2-B
INVENTOR.
HARVEY I. JAUVTIS
BY Harry A. Herbert Jr.
Julian L. Siegel
ATTORNEYS INVENTOR.
HARVEY I. JAUVTIS
BY Harry A. Herbert Jr
Julian L. Siegel and
ATTORNE

BI-DIRECTIONAL SHIFT REGISTER

BACKGROUND OF THE INVENTION

This invention relates to shift registers, and more particularly to a magnetic domain bi-directional shift register.

The invention uses the technique called domain tip propagation logic (DTPL), and makes use of the controlled growth of domains which are confined to a pattern of narrow, low coercive force channels embedded in a film element of domains of reversed magnetization and propagated through the channels under the influence of an applied field by expansion of the domains at the domain tips. In this manner it is possible to control the direction of domain tip propagation. The dependence of the direction of domain tip propagation upon the magnitude and direction of the applied field and the speed of domain tip propagation are such as to allow the construction of the shift register presented here.

As a result of the geometry of the low coercive force channels, the direction of domain tip propagation is sensitive to the magnitude and direction of the applied field. This feature is applied here to present a novel thin film shift register which is of essentially unlimited length, and high storage density and speed.

The term "domain tip propagation" is used to described magnetization reversal which occurs by growth of a domain of reversed magnetization in the vicinity of the spike-like extremity of the domain as opposed to the sidewise expansion of the domain boundaries. The direction of domain tip propagation is sensitive to the direction of the applied field causing switching. Tip propagation can be directed to one side of the easy axis or to the other, depending upon the sense of the hard axis component of the drive field.

In order to provide a reliable control over the direction of tip propagation for the purpose of device fabrication, it is possible to build into the magnetic film element channels of low coercive force through which domain tips can travel. The magnetic material outside these channels is of high coercive force so that switching of the magnetization is restricted to within the low coercive force channel by the growth of domains of reversed magnetization at the domain tips. The high coercive force material external to the propagation channels, in addition to restricting flux reversal to a particular pattern of low coercive force paths, provides a continuity of magnetization at the channel edges and thus inhibits the spontaneous nucleation of unwanted domains within the low coercive force channels.

The necessary increase in film coercivity outside the propagation channels is easily provided by evaporating a thin layer of aluminum prior to the deposition of the magnetic film. The aluminum underlayer is extremely effective in causing an increase in coercive force of the overlying magnetic film. Through the use of photo etching techniques the aluminum film can be removed in regions which are to become the low coercive force channels for tip propagation with the result that the subsequently evaporated magnetic film will be of high coercive force except in regions where removal of the aluminum has taken place. Film coercivity in regions overlying the aluminum is much greater. A variety of other techniques can be used to achieve an equivalent result.

SUMMARY OF THE INVENTION

The present invention is a bi-directional shift register which uses punch-through magnetic domain diodes. A punch-through diode is a diode whose unidirectional characteristics can be made bi-directional by application of a magnetic filed in the desired direction. A series of diodes in alternating polarity are positioned in a domain channel. Magnetic fields are applied to certain diodes while at the same time applying a drive filed. As a result, information in the form of magnetic domains will be transferred or propagated. An erase pulse is then applied, which is a drive pulse but in the opposite direction, while a current is applied to a hold conductor to create a magnetic field. This conductor interlaces every two diodes so that erasure is selective.

It is therefore an object of this invention to provide a nonvolatile shift register.

It is another object to provide a magnetic domain tip propagation shift register.

It is still another object to provide a bi-directional vertical shift register using punch-through magnetic domain diodes.

It is still another object to provide a shift register that can operate on low power and zero standby power.

It is yet another object to provide a shift register that has wide frequency operating margins.

It is still another object to provide a shift register that is insensitive to radiation and temperature.

These and other advantages, features and objects of the invention will become more apparent from the following description taken in connection with the illustrative embodiment in the accompanying drawings, wherein:

DESCRIPTION OF THE DRAWINGS

FIG. 1 is a drawing partly in schematic showing an embodiment of the invention;

FIGS. 2*a* and 2*b* are timing diagrams used for a better explanation of FIG. 1.

DETAILED DESCRIPTION OF THE PREFERRED EMBODIMENT

Referring to FIG. 1, there is shown a bi-directional vertical shift register in which the hold portion represents channels of low coercive force surrounded by regions of high coercive force thereby controlling propagation of magnetic domains. Arrow 12 represent the easy axis and the direction of the drive or propagation field which will be explained subsequently.

Figure 3:
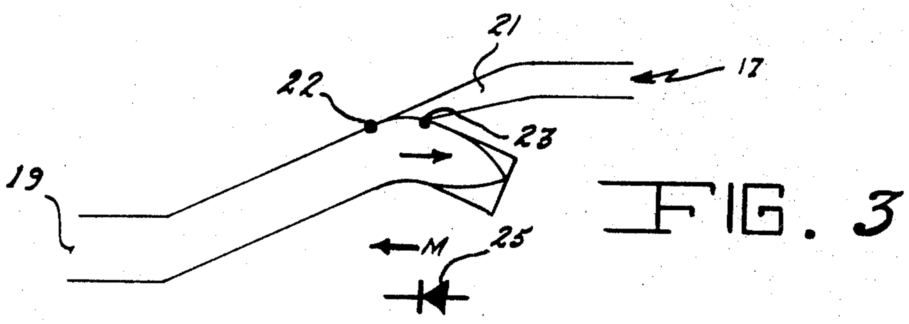
FIG. 3 is a diagram of a magnetic domain diode.

Magnetic domain diodes designated as A, B, C and D are of the punch-through type. A magnetic domain tip steering diode is shown and described in U.S. Pat. No. 3,465,326 issued to Robert J. Spain and Harvey I. Jauvtis, entitled, Non-Reciprocal Magnetic Transmission Paths Formed In Thin Magnetic Films, and is also shown in FIG. 3. The forward direction threshold field is determined by the tip coercive force in channel 21 when information propagates from position 17 to position 19. The back, or diode breakdown threshold, is equal to the field which causes punch-through into channel 21 of a wall initially pinned at points 22 and 23. Typical diodes operate between four oersteds and 10 oersteds for drive fields parallel to the easy axis. The symbol shown at 25 depicts the magnetic domain diode.

Figure 4:
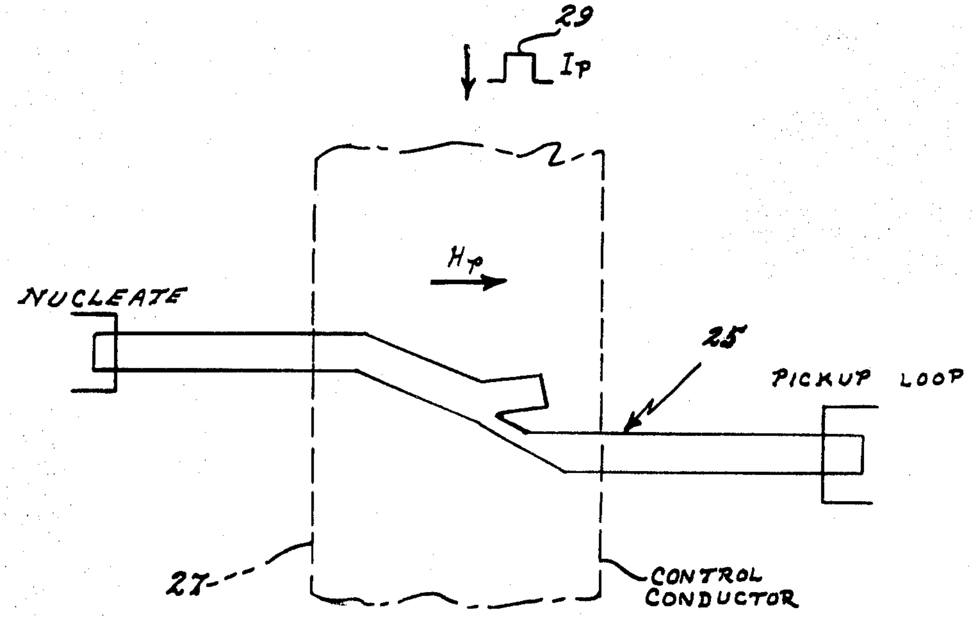
FIG. 4 is a diagram showing the function of a punch-through magnetic domain diode.

FIG. 4 shows the function of a punch-through diode and control conductor 27 perpendicular to it. A pulse of current 29 is passed through conductor 27 producing a magnetic field perpendicular to the current to permit punch-through.

Referring again to FIG. 1, the magnetic domain circuit which includes domain diodes, A, B, C and D is in a single layer and utilizes four folded control conductors, A′, B′, C′ and D′, which are contained in the second layer and hold conductor 31 in a third layer. The main propagate and erase fields are uniformly applied along the film easy axis in the direction shown by arrows 13 and 15 respectively, by the customary method of creating a magnetic field, i.e. passing current through a field coil surrounding the device. This technique is basic and well-known in the operation of magnetic domain tip propagation devices. Locations 33 to 41 are positioned where bits of information in the form of magnetic domains can be stored. A timing diagram is shown in FIG. 2 where it is seen that only two conductors must be energized to shift information in either direction. The diodes associated with unselected control lines perform the functions of blocking back propagation and preventing extended forward propagation. One cycle of operation will now be described in the direction shown by arrow 26 referred to as the "push-down" direction.

First, with reference to FIG. 2*a*, it is assumed that domain is held at location 34 and all other channels are erased. When the first propagate or drive pulse shown at 43 occurs, conductor A′ is energized and shown as pulse 44 to produce an added drive field. One tip of the stored domain is blocked by diode D and the other is punched through diode A, coming to rest at diode B which is a point slightly displaced from position 35. The erase and hold operation shown as 45 and 47 then occur and the domain is held at location 35 as the other channels are erased. The propagate field is again energized shown as pulse 49 and conductor B′ is pulsed (shown as 51 on the timing diagram) with the same polarity of current as that used to drive A′. Punch-through now takes place in diode B, and information continues through the forward direction of diode D until it is blocked at diode A. Propagation in the back direction from location 35 is prevented by action of diode C. The next erase and hold pulses 53 and 55 leave a domain stored at location 36 which is the starting point for the second cycle of operation. When information is shifted down the second leg of the register the order of diodes encountered is D, B, C and A, as compared to A, C, B and D in the first column, but the operation of the register is unchanged. In order to operate the register in the opposite direction shown by arrow 28 referred to as the "pull-up" direction, control conductors C′ and D′ are pulsed shown as 57 and 59 during successive drive cycles shown as 61 and 63. Diodes A and B now serve to prevent back propagation.

Methods of nucleation of the domain, read out, et cetera, are conventional and standard in the art.

I claim:

1. A magnetic domain shift register comprising:

a. a first vertical channel of low coercive force surrounded by a region of high coercivity;

b. a first plurality of magnetic domain diodes, positioned along the vertical channel in an alternating sequence of given polarities;

c. a continuous conductor passing adjacent to the first vertical channel at right angles between every two diodes such as the direction of the current in the conductor is transversing the first vertical channel in alternating sequence;

d. means for rendering the diodes conductive in the opposite direction as that of the given polarities thereof;

e. means for applying a propagating field to the first vertical channel; and f. first means for applying an erase field to the vertical channel.

2. A magnetic domain shift register according to claim 1 which further comprises:

a. a second vertical channel parallel with the first vertical channel and in the region of the propagating and erase fields, the second vertical channel passing at right angles to the continuous conductor with one extreme of each conductor connected to each other; and b. a second plurality of magnetic domain diodes positioned along the second vertical channel in alternating sequence of given polarities and connected to the means for rendering the diodes conductive in the opposite direction.

3. A magnetic domain shift register according to claim 2 wherein the means for rendering the diodes conductive in the opposite direction comprises a control conductor passing at essentially right angles and adjacent to the diodes creating magnetic fields.

* * * * *